United States Patent [19]

Lake, Jr.

[11] Patent Number: 4,526,216

[45] Date of Patent: Jul. 2, 1985

[54] UNLEADED FUEL FILLING SYSTEM FOR TANKS WITHOUT INLET PIPE

[75] Inventor: Leo C. Lake, Jr., Anaheim, Calif.

[73] Assignee: Yamaha Motor Corporation, U.S.A., Cypress, Calif.

[21] Appl. No.: 494,804

[22] Filed: May 16, 1983

[51] Int. Cl.³ .................. B67D 5/372; B65B 31/06
[52] U.S. Cl. .................... 141/348; 141/286; 137/588; 220/86 R; 251/149.2
[58] Field of Search ............ 251/149.2, 339; 137/351, 392, 588; 220/35, 36, 86 R, 86 T; 141/348, 349, 350, 331, 335, 344, 325, 326, 285, 286, 392

[56] References Cited

U.S. PATENT DOCUMENTS

| | | | |
|---|---|---|---|
| 1,810,366 | 6/1931 | Martin | 251/149.5 |
| 2,801,767 | 8/1957 | Mariani | 220/86 |
| 3,019,807 | 2/1962 | Projahn | 137/199 |
| 3,176,488 | 10/1966 | Holmes | 141/311 |
| 3,580,414 | 5/1971 | Ginsburgh | 220/86 |
| 3,730,216 | 5/1973 | Arnett et al. | 137/588 |
| 3,911,977 | 10/1975 | Berger | 141/348 |
| 4,235,263 | 11/1980 | Lake | 141/1 |

Primary Examiner—Houston S. Bell, Jr.
Attorney, Agent, or Firm—Freilich, Hornbaker, Rosen & Fernandez

[57] ABSTRACT

An insert is provided for a liquid inlet at the top of a tank not having a fill pipe for preventing liquid from a nozzle spout of a diameter greater than a predetermined dimension from filling the tank, and allowing liquid from a nozzle of smaller diameter to fill the tank to very near the top. The insert has a mouth with a wide opening at the top and an opening at the bottom just large enough to receive a spout having that predetermined diameter. A throat having an internal diameter slightly greater than that predetermined dimension extends from the bottom opening. A valve closes the throat under the force of a spring and a grid prevents the nozzle spout from being inserted past the end of the throat. Connected to the valve is a structure that is engaged by the nozzle when said spout is inserted into the throat to open the valve and permit liquid from the spout to pass into the tank.

5 Claims, 11 Drawing Figures

U.S. Patent  Jul. 2, 1985  Sheet 2 of 2  4,526,216
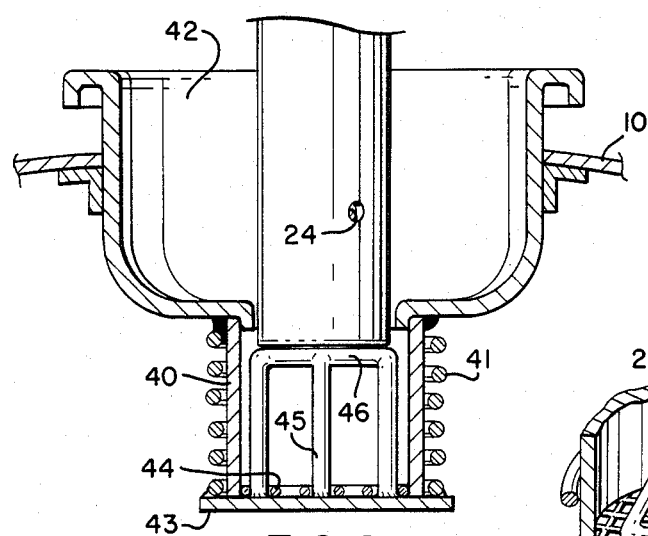
FIG.6
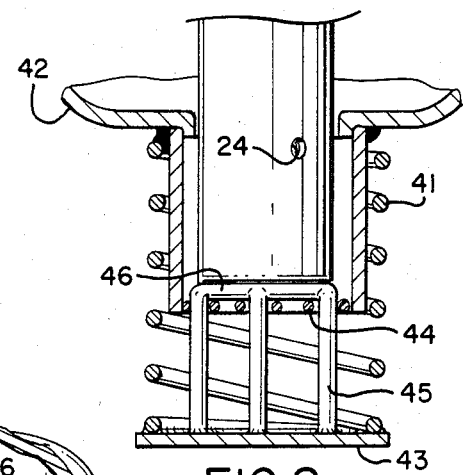
FIG.8
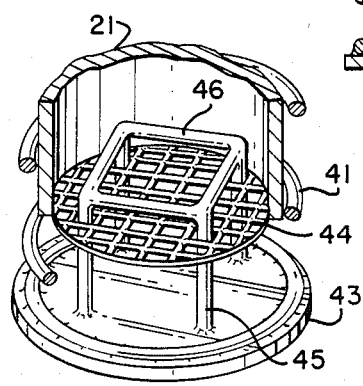
FIG.7
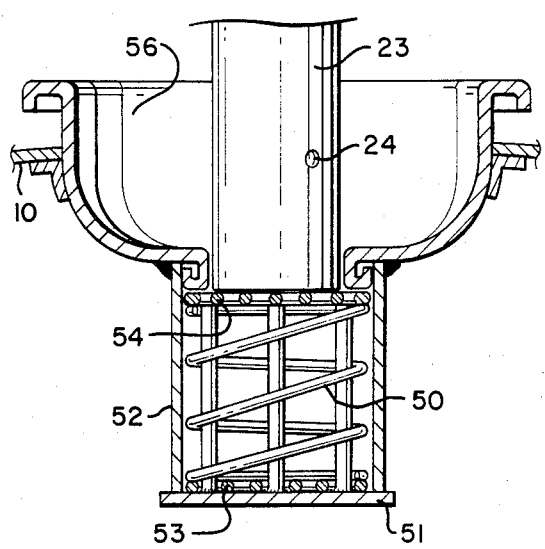
FIG.9
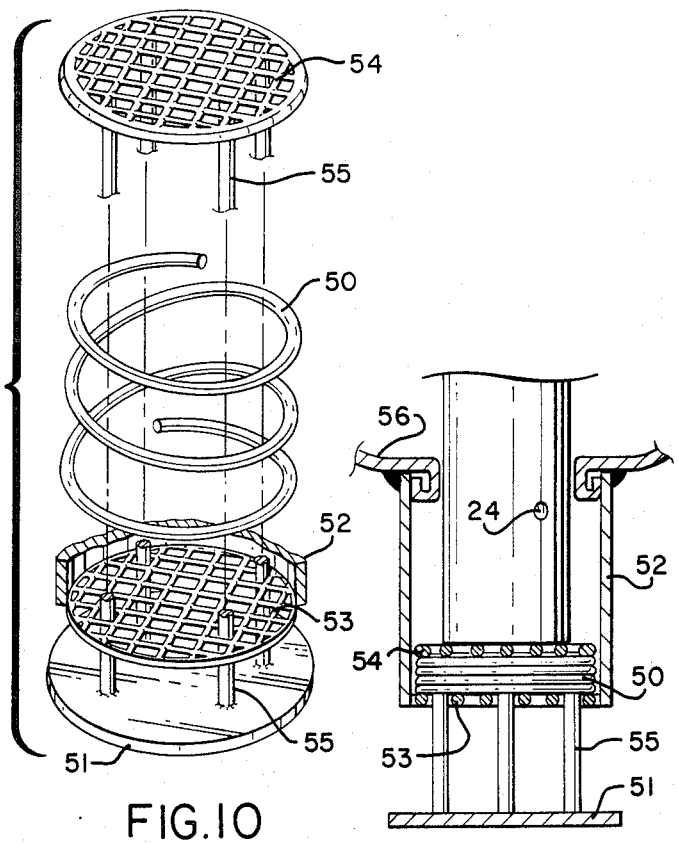
FIG.10
FIG.11

UNLEADED FUEL FILLING SYSTEM FOR TANKS WITHOUT INLET PIPE

BACKGROUND OF THE INVENTION

This invention relates to a fuel filling system for gasoline tanks not having an inlet pipe, such as used on motorcycles, and applies particularly to those machines outfitted with a catalytic converter.

In order to minimize pollution of the atmosphere by internal combustion engines, catalytic converters have become standard emission control devices for automobiles. Since catalytic converters will be significantly impaired by the use of leaded gasoline, vehicles equipped with catalytic converters must have a gasoline tank with a filler inlet having a restriction that admits only a nozzle with a spout of smaller diameter used in dispensing unleaded fuel. In addition, the filler inlet must be designed so that it will not pass more than 700 cc of gasoline before operating the automatic shutoff mechanism triggered by the plugging of a vacuum port located within about 0.87 inches (2.2 cm) of the tip when the introduction of gasoline into the filler inlet is attempted with a standard nozzle having a diameter of 0.93 inches (2.36 cm).

To satisfy these requirements, inserts have been designed for filler inlets which provide a 0.840 inch diameter restriction (2.13 cm diameter) more than 0.87 inches (2.2 cm) into the inlet, and a valve downstream of the restriction. When the nozzle spout of an unleaded fuel dispenser head is inserted into the filler inlet through the restriction, the valve is pushed open by the nozzle to admit fuel into the tank at a rate of 8±1 gallon/minute (30.4±3.8 L). Since the spout of a standard nozzle cannot be inserted into the filler pipe through the restriction, the valve will remain closed. As a consequence, any attempt to introduce leaded fuel into the tank will cause fuel to back up and plug the vacuum port of the nozzle to shut off the nozzle. The only fuel dispensed will thus be restricted to that which the insert will hold between the valve and the vacuum hole on the nozzle, which can be designed to be less than 700 cc. U.S. Pat. Nos. 3,730,216 and 3,911,977 are representative of this type of insert for automobile filler pipes.

These prior-art inserts have been designed for fuel tanks having fill pipes so that the nozzle can be inserted well past the restriction and still fill the tank completely. The nozzle is not shut off until fuel backs up in the filler pipe to plug the vacuum port. In some machines requiring a filler insert, the prior-art inserts cannot be used because there is no inlet pipe; instead the filler inlet opens directly into the tank, which is usually quite shallow, such as in the case of motorcycles. If the nozzle spout were to be inserted past the filler inlet restriction as far as it will go, only a disconcerting fraction of fuel can be put into the tank before the automatic shutoff is actuated. Moreover, it is generally necessary to watch the fuel level rising to detect when it is very near the top, and this would not be possible with a small nozzle inserted into a restricted opening. What is required is a filler insert which not only allows the tank to be filled to very near the filler opening without being able to see inside the tank, but also satisfies the other requirements, namely a restriction that will allow only unleaded fuel nozzles to be inserted, and pass a maximum of 700 cc of gasoline before automatic shutoff when an attempt is made to fill the tank with a larger, leaded fuel nozzle.

SUMMARY OF THE INVENTION

In accordance with the invention, a filler insert is provided with a mouth approximately 2.5 to 3 inches (6.35 to 7.62 cm) in diameter and only slightly more than 0.87 inches (2.21 cm) deep. At the bottom of this mouth there is a short throat with an opening at the top just large enough to admit into the throat a nozzle spout intended for unleaded fuel only, and not admit a nozzle of standard diameter (0.930 inch=2.362 cm) that may be used for leaded and other fuel. The diameter of the throat itself is slightly larger (0.87 inch=2.21 cm) than the restricted opening at the top (0.84 inch=2.134 cm), and of a length slightly greater than the distance of the automatic shutoff vacuum port in the nozzle from spout, e.g., about 1 to 1.25 inches (2.54 to 3.175 cm) long. The dimensions given are for current regulations and not, per se, a part of the invention, which may be practiced under a different set of dimensions.

Means, such as a very coarse wire mesh at the bottom of the throat, prevents the nozzle spout from being inserted any further than is necessary to place the vacuum shutoff port of the nozzle just past the restriction in the throat. A spring biased valve at the bottom of the throat closes the throat to prevent fuel from passing into the tank unless the nozzle spout of smaller diameter for unleaded fuel is inserted past the restricted opening at the top of the throat to open the valve. Means extending upwardly from the valve through the grid engages the spout of the nozzle so that as the nozzle is inserted into the throat past the restriction of the insert, it will push on said means and force the valve open against the force of the spring.

When the tank fills to the level of the vacuum port in the nozzle, the automatic shutoff mechanism is actuated, thus allowing the tank to be filled to a level at about the top of the throat. Removal of the nozzle automatically closes the valve. If an attempt is made to add fuel to the tank with a larger nozzle, the valve will remain closed, and both the throat and mouth will fill with less than 700 cc to plug the vacuum port and actuate the shutoff mechanism. This valve has a further advantage of effectively limiting the surge of fuel which may occur during sudden stops of a motorcycle, such as in a head-on collision.

The novel features of the invention are set forth with particularity in the appended claims. The invention will best be understood from the following description when read in conjunction with the accompanying drawings.

BRIEF DESCRIPTION OF THE DRAWINGS

FIG. 6 is a cross section taken on a line 2—2 of FIG. 1 for a second embodiment of this invention.

FIG. 7 illustrates in perspective part of the cross section of FIG. 6 with the valve open.

FIG. 8 illustrates the cross section of FIG. 6 with the valve pushed open by a refueling nozzle of proper diameter.

FIG. 9 is a cross section taken on line 2—2 of FIG. 1 for a third embodiment of this invention.

FIG. 10 is a perspective view of the valve assembly for this third embodiment.

FIG. 11 illustrates the cross section of FIG. 9 with the valve pushed open by a refueling nozzle of proper diameter.

DESCRIPTION OF PREFERRED EMBODIMENTS

Figure 1:
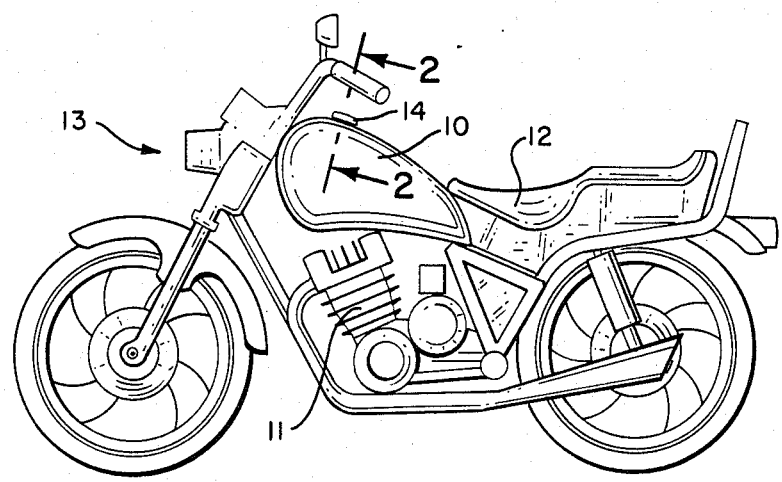
FIG. 1 illustrates the position of a filler inlet on top of a fuel tank of a motorcycle.

FIG. 1 illustrates the conventional location of a fuel tank 10 on a motorcycle, which is above the motor 11 between the motorcycle seat 12 and the front fork assembly 13. The tank is sometimes shrouded, and the filler inlet is usually up front near the highest point in the tank, as indicated by the position of a filler cap 14 in FIG. 1.

To fill such a tank to the top with a small-diameter nozzle for unleaded fuel, or a standard, large-diameter nozzle for leaded and other fuel, the spout of the nozzle is inserted into the tank about one inch inside the filler inlet. But to comply with current regulations for motor vehicles equipped with a catalytic converter, an insert must be provided which, as noted hereinbefore, prevents a nozzle having a spout of a diameter greater than 0.840 inches from passing more than 700 cc of fuel into the tank. This is customarily done in the filler pipe of an automobile, but since a motorcycle does not have such a pipe, a special insert must be provided at the filler inlet which not only meets these requirements, but also allows the tank to be filled to very near the top without spilling, and without being able to see inside the tank.

Figures 2, 3:
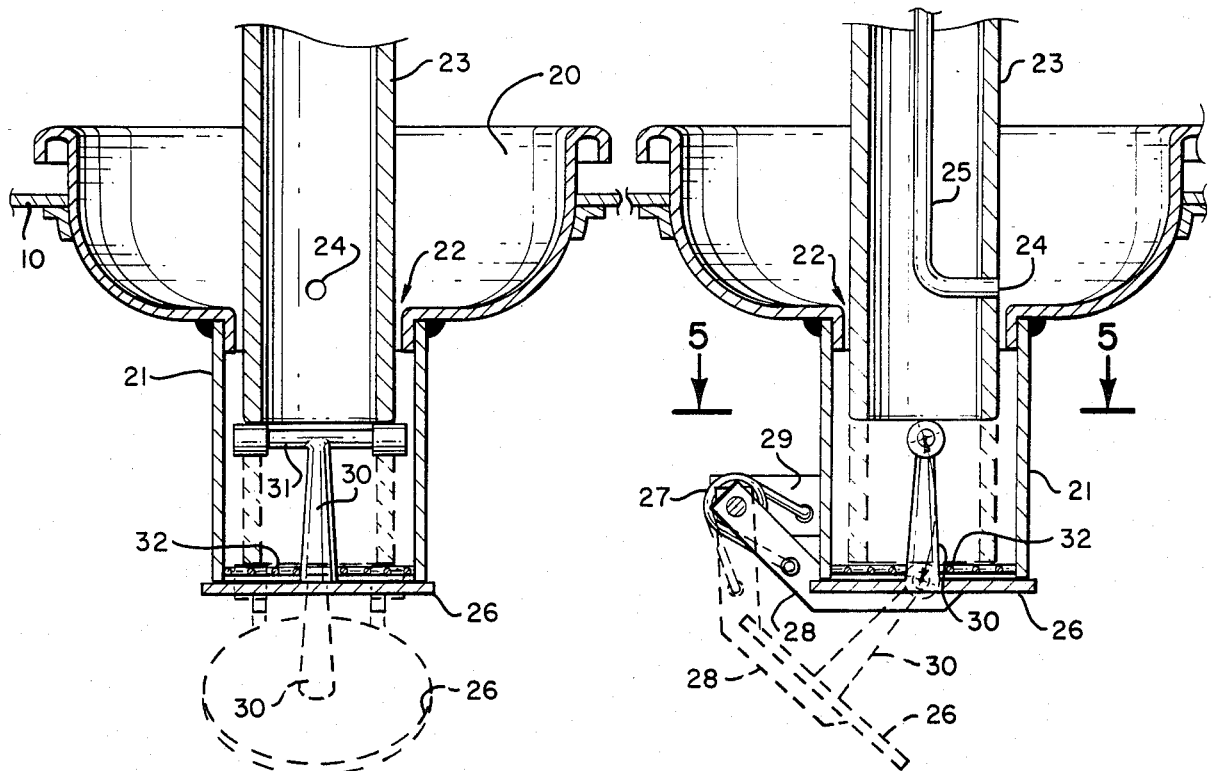
FIG. 2 is a cross section taken on a line 2—2 in FIG. 1 of the filler inlet provided with an insert in accordance with one embodiment of this invention.
FIG. 3 is a cross section taken at 90° from the cross section in FIG. 2.

FIG. 2 illustrates one embodiment of such a special insert provided with a mouth 20 approximately 2.5 to 3 inches (6.35 to 7.62 cm) in diameter and only slightly more than 0.87 inches (2.21 cm) deep. At the bottom of the mouth 20, there is a short throat 21. The diameter of an opening 22 from the mouth 20 into the throat 21 is 0.84 inches (2.13 cm), just large enough to admit the spout of a nozzle 23 used for unleaded fuel only. Beyond that small opening (restriction), the internal diameter of the throat 21 is slightly larger, such as 0.87 inches (2.21 cm), so that a vacuum port 24 that is 0.875 inches (2.2225 cm) from the spout of the nozzle 23 will not be blocked by the wall of the throat, and so that fuel may readily pass along the outside of the nozzle to the vacuum hole when the nozzle is inserted into the throat as shown in dotted lines in FIGS. 2 and 3. The tank may thus be filled to very near the top, which is to the level of the vacuum port 24 with the nozzle inserted into the throat 21. A tube 25, shown in FIG. 3, extends from the vacuum hole to a mechanism which automatically shuts the nozzle off when fuel plugs the vacuum hole.

Referring to FIG. 3, a flap valve 26 is held against the bottom of the throat 21 by a torsional spring 27 operating on a lever 28 pivoted on a bracket 29. Extending into the throat 21 from the top of the valve 26 is a post 30 with a cross bar 31. Rollers may be added at the ends of the cross bar, as shown. As the nozzle is inserted into the throat 21, its spout bears against the cross bar (or rollers on the cross bar) to force the valve open against the force of the spring 27.

Figure 4:
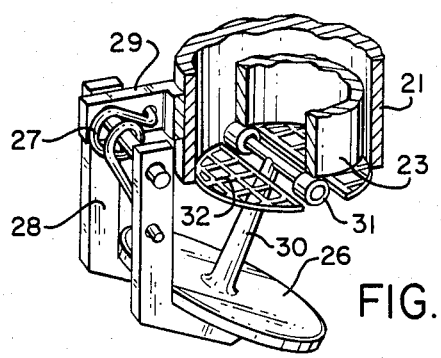
FIG. 4 is a perspective view of the valve assembly for this first embodiment.
Figure 5:
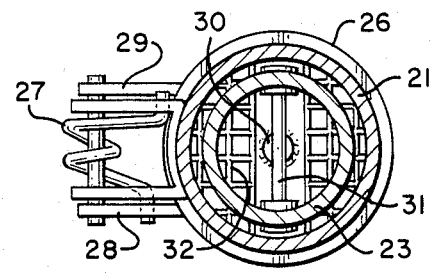
FIG. 5 is a cross section taken on a line 5—5 in FIG. 3.

A coarse wire mesh or grill 32 prevents the nozzle from being inserted further, or may be best seen in FIGS. 4 and 5. The post 30 passes through an opening in the grill 32 to allow it to force the valve 26 away from the bottom of the throat 21. In that position of the valve, there is ample passage for the fuel to flow into the tank, as may be seen in FIG. 4, at a rate of 7 to 9 gallons (26.6 to 34.2 L) per minute. As the tank fills past the bottom of the throat 21, the fuel level in the throat rises until the vacuum port 24 is blocked to shut off the nozzle. This level will then be within about 1 to 2 inches (2.54 to 5.8 cm) of the top of the tank, depending upon the exact depth of the mouth 20, and the length of the throat.

FIG. 6 illustrates a second embodiment wherein a throat 40 and tensioned extension coil spring 41 outside the throat are both welded to the bottom of a mouth 42, and a disk valve 43 is welded to the bottom of the spring. The spring holds the valve disk up against the bottom of the throat. Extending through openings in a coarse wire mesh or grid 44 best shown in FIG. 7, are several pins (three or four, with four being shown) connected at their upper ends to rods 46, and at their lower ends to the top of the valve 43, best shown in FIG. 7. This structure of pins and rods serves the same purpose as the post and cross bar in the first embodiment. When the nozzle is inserted to the extent that the grid 44 permits, the spring is extended and the valve is opened, as shown in FIG. 8.

FIGS. 9, 10, and 11 illustrate still another embodiment similar to the second embodiment but using a compression coil spring 50 which forces a valve 51 against the bottom of a throat 52. The spring is seated on a grid 53 at the bottom of the throat, and retained at least partially compressed by a grid 54 secured to the top of posts 55 extending up inside (or outside) the coil spring. The posts are secured at their other ends to the valve 51, as is best shown in FIG. 10. In practice, the posts pass through openings in the grid 53, which is secured to the inside of the throat 52. Until the nozzle 23 is inserted into the throat 52 to open the valve 51 against the force of the spring 50, fuel will not pass into the tank. Instead, less than 700 cc of fuel will fill the throat 52 and mouth 56 to cause the vacuum port 24 of the nozzle to become plugged, thereby shutting off the nozzle. When the nozzle 23 pushes against the grid 54, it pushes the valve 51 (through the posts 55) away from the bottom of the throat, at the same time compressing the coil spring against the grid 53, as shown in FIG. 11.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. An insert for a liquid insert at the top of a tank for receiving a nozzle spout having a vacuum port about 0.87 inches from the tip comprising a mouth having a wide opening of about 2.5 to 3 inches in diameter at the top and a small opening of about 0.84 inches in diameter at the bottom, said mouth being about 0.87 inches deep; a throat extending about 1 to 1.25 inches from the bottom of said small opening, said throat having a diameter of about 0.87 inches; a valve adapted to engage the bottom of said throat for closing said throat; a spring attached to said valve for holding said valve closed; and means having an opening therein attached to the bottom of said throat for preventing said nozzle spout from being inserted past the end of said throat; said valve having means connected thereto to engage said spout for opening said throat when said spout is inserted into said throat, thereby to permit liquid from said spout to pass into said tank through said throat only while said spout is inserted into said throat, and to cause said liquid to back up in said mouth if said spout is not inserted into said tank.

2. An insert as defined in claim 1 wherein said valve means and said spring are outside of said throat, and said valve opening means comprised of means extending upwardly into said throat for the nozzle spout to bear against, thereby to open said valve against the force of said spring when said spout is inserted into said throat.

3. An insert as defined in claim 2 wherein said valve means is comprised of a flap valve hinged outside of said throat and held against the outside of said spout by said spring, and said spring is a torsional spring.

4. An insert as defined in claim 2 wherein said valve is a disk valve held against the outside of said spout by said spring, and said spring is a tensioned extension coil spring having one end attached to the outside of said throat and the other attached to said valve.

5. An insert for a liquid inlet at the top of a tank for receiving a nozzle spout having a vacuum port about 0.87 inches from the tip comprising a mouth having a wide opening of about 2.5 to 3 inches in diameter at the top and a small opening of about 0.84 inches in diameter at the bottom, said mouth being about 0.87 inches deep, a throat extending about 1 to 1.25 inches from the bottom of said small opening, said throat having a diameter of about 0.87 inches a disc valve outside of said throat adapted to engage the bottom of said throat for closing said throat; a compression coil spring inside of said throat for holding said valve closed; and a first grid connected to said throat for preventing said nozzle spout from being inserted past the end of said throat; said valve having means connected thereto to engage said spout for opening said throat when said spout is inserted into said throat, thereby to permit liquid from said spout to pass into said tank through said throat only while said spout is inserted into said throat, and to cause said liquid to back up in said mouth if said spout is not inserted into said tank, said throat opening means having one end attached to said disk valve, and the other end attached to a second grid in said throat for the nozzle spout to bear against, with said compression coil spring between said second grid and said first grid.

* * * * *